(12) United States Patent
Pestov (10) Patent No.: US 11,113,528 B2
(45) Date of Patent: Sep. 7, 2021

(54) SYSTEM AND METHOD FOR VALIDATING GEOSPATIAL DATA COLLECTION WITH MEDIATED REALITY

(71) Applicant: VGIS INC., Toronto (CA)

(72) Inventor: Alexandre Pestov, Toronto (CA)

( * ) Notice: Subject to any disclaimer, the term of this patent is extended or adjusted under 35 U.S.C. 154(b) by 13 days.

(21) Appl. No.: 16/583,767

(22) Filed: Sep. 26, 2019

(65) Prior Publication Data

US 2021/0097282 A1 Apr. 1, 2021

(51) Int. Cl.
| | |
|---|---|
| *G06K 9/00* | (2006.01) |
| *G06N 5/02* | (2006.01) |
| *G06T 1/00* | (2006.01) |
| *G06F 3/01* | (2006.01) |
| *G06F 16/29* | (2019.01) |

(52) U.S. Cl.
CPC .......... *G06K 9/00671* (2013.01); *G06F 3/011* (2013.01); *G06N 5/02* (2013.01); *G06T 1/0014* (2013.01); *G06F 16/29* (2019.01); *G06K 2209/27* (2013.01)

(58) Field of Classification Search
CPC ............ G06K 9/00671; G06K 2209/27; G06F 3/011; G06F 16/29; G06N 5/02; G06T 1/0014; G06T 19/006
See application file for complete search history.

(56) References Cited

U.S. PATENT DOCUMENTS

| | | | | |
|---|---|---|---|---|
| 2009/0293012 A1* | 11/2009 | Alter | ................... | G06F 3/0346 715/810 |
| 2012/0249741 A1* | 10/2012 | Maciocci | .............. | G06T 15/503 348/46 |
| 2014/0176530 A1* | 6/2014 | Pathre | .................... | G06T 19/20 345/419 |
| 2016/0224657 A1* | 8/2016 | Mullins | ................. | G06F 16/951 |
| 2018/0082475 A1* | 3/2018 | Sharma | ................... | G06F 3/147 |

OTHER PUBLICATIONS

"What is the Difference Between GNSS and GPS", https://www.semiconductorstore.com/blog/2015/What-is-the-Difference-Between-GNSS-and-GPS/1550/#:~:text=GNSS%20stands%20for%20Global%20Navigation,Beidou%20and%20other%20regional%20systems, Dec. 16, 2015 (Year: 2015).*

* cited by examiner

*Primary Examiner* — Michelle L Sams
(74) *Attorney, Agent, or Firm* — Bhole IP Law; Anil Bhole; Marc Lampert (57) ABSTRACT

There is provided a system and method of validating geospatial object data with mediated reality. The method including: receiving an object definition associated with a geospatial object, the object definition comprising a type of object and a position; displaying a visual representation of the geospatial object to a user relative to a corresponding geospatial object located in a physical scene; and receiving input validating a placement of the visual representation relative to the corresponding geospatial object located in the physical scene.

18 Claims, 8 Drawing Sheets

SYSTEM AND METHOD FOR VALIDATING GEOSPATIAL DATA COLLECTION WITH MEDIATED REALITY

TECHNICAL FIELD

The following relates generally to geospatial data management; and more particularly, to systems and methods for validating geospatial data collection with mediated reality.

BACKGROUND

Surveying firms, mapping firms, municipalities, public utilities, and many other entities, collect, store, use, and disseminate vast amounts of geospatial data. This geospatial data can be used to manage daily operations and conduct mission-critical tasks; for example, asset maintenance, construction plan design, zoning proposals, among many others. Traditionally, geospatial data is collected using manual measurements (offsets) from detectable local landscape features; for example, a curb line. Then the collected measurements would be plotted on a map to indicate object/asset locations. The maps could then be reprinted for use in the field. While much of this geospatial data can be digitized, the accuracy and quality of such digital representations may affect the tasks and applications that rely on such data. In other approaches, location tools, such as global navigation satellite systems (GNSS) and/or real-time kinematic (RTK), can be used to collect digital geospatial data. These approaches generally require cumbersome, unsophisticated, and time-consuming validation techniques.

SUMMARY

In an aspect, there is provided a computer-implemented method of validating geospatial object data collection with mediated reality, the method comprising: receiving an object definition associated with a geospatial object, the object definition comprising a type of object and a position; displaying a visual representation of the geospatial object to a user relative to a corresponding geospatial object located in a physical scene; and receiving input validating a placement of the visual representation relative to the corresponding geospatial object located in the physical scene.

In a particular case of the method, the position of the geospatial object in the object definition comprises latitude and longitude.

In another case of the method, the position of the geospatial object in the object definition comprises a point associated with the geospatial object.

In yet another case of the method, the position of the geospatial object is determined using at least one of global navigation satellite systems (GNSS) and real-time kinematic (RTK) positioning.

In yet another case of the method, receiving input validating the placement of the visual representation comprises receiving a confirmatory input from a user.

In yet another case of the method, receiving input validating the placement of the visual representation comprises receiving a confirmatory output from machine vision and artificial intelligence techniques.

In yet another case of the method, the method further comprising recording, in the object definition, the validated position of the geospatial object.

In yet another case of the method, the object definition further comprises one or more attributes associated with the geospatial object, and the method further comprises receiving input validating one or more of the attributes associated with the geospatial object.

In yet another case of the method, the method further comprising recording, in the object definition, the one or more validated attributes associated with the geospatial object.

In yet another case of the method, the method further comprising associating an image of the physical scene with the validated position.

In another aspect, there is provided a system of validating geospatial object data collection with mediated reality, the system comprising one or more processors and data storage memory in communication with the one or more processors, the one or more processors configured to execute: an object module to receive an object definition associated with a geospatial object, the object definition comprising a type of object and a position; a display module to display a visual representation of the geospatial object to a user relative to a corresponding geospatial object located in a physical scene; a validation module to receive input validating a placement of the visual representation relative to the corresponding geospatial object located in the physical scene.

In a particular case of the system, the position of the geospatial object in the object definition comprises latitude and longitude.

In another case of the system, the position of the geospatial object in the object definition comprises a point associated with the geospatial object.

In yet another case of the system, the position of the geospatial object is determined using at least one of global navigation satellite systems (GNSS) and real-time kinematic (RTK) positioning.

In yet another case of the system, receiving the input validating the placement of the visual representation comprises receiving a confirmatory input from a user via an input device.

In yet another case of the system, receiving input validating the placement of the visual representation comprises receiving a confirmatory output from machine vision and artificial intelligence techniques.

In yet another case of the system, the system further comprising a recordation module to record, in the object definition, the validated position of the geospatial object.

In yet another case of the system, the object definition further comprises one or more attributes associated with the geospatial object, and wherein the validation module further receives input validating one or more of the attributes associated with the geospatial object.

In yet another case of the system, the system further comprising a recordation module to record, in the object definition, the one or more validated attributes associated with the geospatial object.

In yet another case of the system, the system further comprising a recordation module to record an image of the physical scene associated with the validated position.

These and other aspects are contemplated and described herein. It will be appreciated that the foregoing summary sets out representative aspects of the system and method to assist skilled readers in understanding the following detailed description.

BRIEF DESCRIPTION OF THE DRAWINGS

A greater understanding of the embodiments will be had with reference to the figures, in which.

DETAILED DESCRIPTION

Embodiments will now be described with reference to the figures. For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures, and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

Any module, unit, component, server, computer, terminal, engine, or device exemplified herein that executes instructions may include or otherwise have access to computer-readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer-readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information, and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application, or module herein described may be implemented using computer readable/executable instructions that may be stored or otherwise held by such computer-readable media and executed by the one or more processors.

The following relates generally to geospatial data management; and more particularly, to systems and methods 'for validating geospatial data collection with mediated reality.

While the following disclosure refers to mediated reality, it is contemplated that this includes any suitable mixture of virtual aspects and real aspects; for example, augmented reality (AR), mixed reality, modulated reality, holograms, and the like. The mediated reality techniques described herein can utilize any suitable hardware; for example, smartphones, tablets, mixed reality devices (for example, Microsoft™ HoloLens™), true holographic systems, purpose-built hardware, and the like.

Advantageously, the present embodiments employ advanced visualization technologies, such as mediated reality techniques, to work in conjunction with other data collection techniques to provide immediate visual validation of data collection accuracy.

Figure 3A:
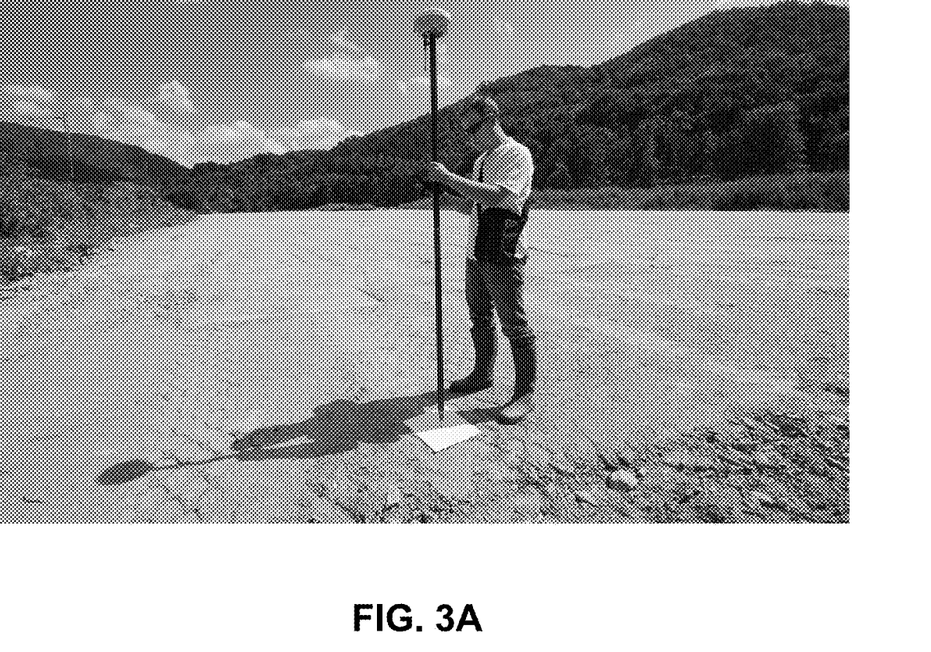
FIG. 3A illustrates an exemplary image of collecting geospatial data by placing an antenna.
Figure 3B:
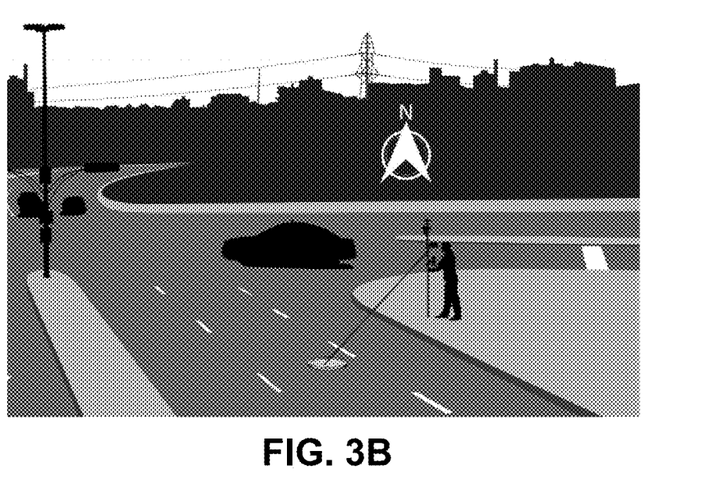
FIG. 3B illustrates an exemplary diagram of collecting geospatial data by placing an antenna.

In some cases, survey-grade data collection can be accomplished with geographic information systems (GIS) using high-precision global navigation satellite systems (GNSS) and/or real-time kinematic (RTK) positioning, to capture location of assets or points for geospatial data collection. As illustrated in the example of FIGS. 3A and 3B, the collection of geospatial data can be accomplished by placing a GNSS antenna near or on top of a placemark and then recording, for example, latitude, longitude and elevation of the antenna; thus, the 'x, y, z' geospatial coordinates of the placemark in two-dimensional (2D) or three-dimensional (3D) space. In some cases, complimentary tools, for example laser mapping, can further enhance collection by allowing collection of data of hard-to-reach objects.

Figure 4:
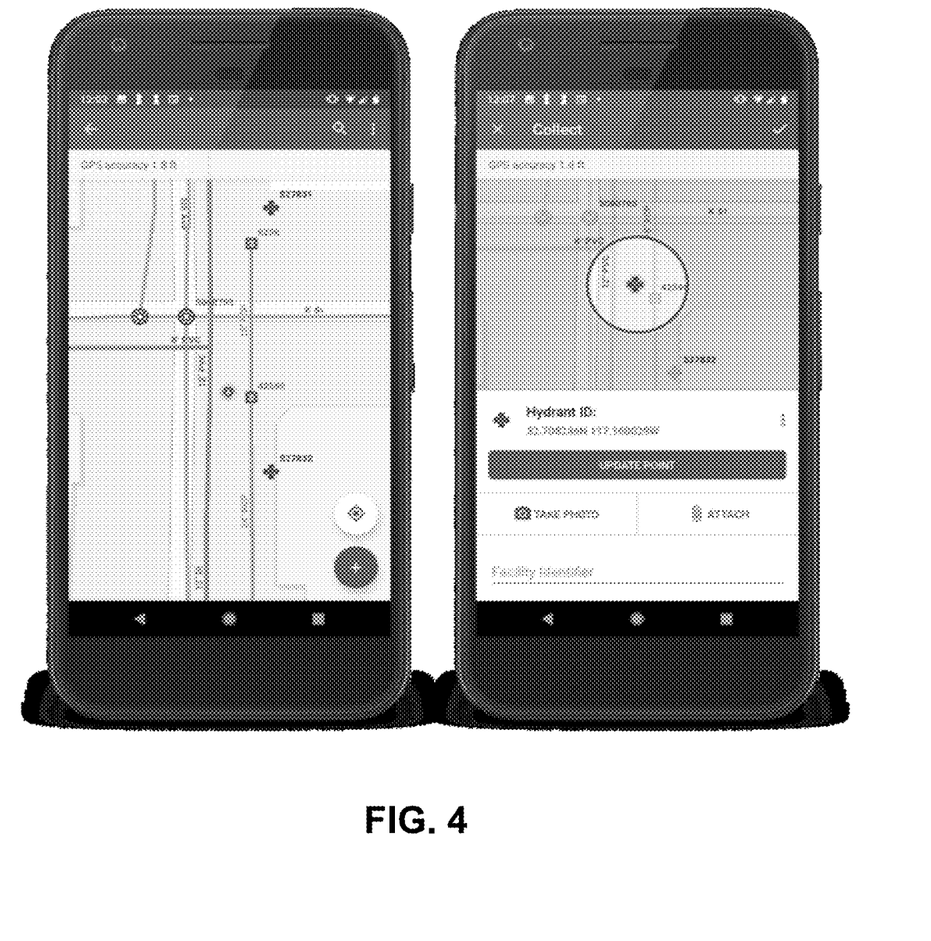
FIG. 4 illustrates exemplary screenshots of two-dimensional maps showing geospatial objects.

As illustrated in the example screenshots of FIG. 4, in some approaches, captured geospatial data can be displayed on a 2D map to help a surveyor, or other user, validate accuracy of the data. In some cases, the captured information can be transferred to a server or stored locally for review. In some cases, the elevation data and other attributes of the object can be stored as part of the captured geospatial data metadata in text format.

In many cases, in order to ensure accuracy of the data, the surveyor is required to check the collected data points and objects multiple times. This requirement can result in substantial inefficiencies for the user, and potentially add substantial time and cost to projects; especially where many objects are to be collected.

Advantageously, embodiments of the present disclosure can substantially improve efficiencies in accuracy verification of collected geospatial objects. Immediately after a data point on a geospatial object is collected, embodiments of the present disclosure can use mediated reality techniques to display a virtually representation of the collected object relative to its physical space. Thus, enabling the user to easily and immediately validate the accuracy of the collected object.

Advantageously, embodiments of the present disclosure can provide real-time visual validation of geospatial object placement in, for example, three-dimensional (3D) space (e.g., latitude, longitude, and elevation). Such embodiments can improve the quality and accuracy of collected geospatial objects, and increase the speed of geospatial object data collection. In some cases, the present embodiments can be used to supplement other tools and approaches for geospatial data collection. In doing so, the present embodiments can reduce the cost of data collection by reducing the time needed for data capture and quality control.

Embodiments of the present disclosure can provide verification by generating a geospatial image overlaid over in an image or video of a scene captured by a camera (for example, as in augmented reality) or displayed as a hologram (for example, as in mixed reality or holographic systems). This can be performed in a manner that anchors to reality through geographical positioning, thereby generating a geographically relevant composite image or a hologram that can be presented to a user.

Embodiments of the present disclosure can advantageously provide a three-dimensional model or a raster symbol of real time data viewable, for example, on mobile devices, wearable devices, or other viewing platforms. The geospatial images can be used to provide real-time visual representations to perform geospatial data verification of data collected via other approaches.

Figure 1:
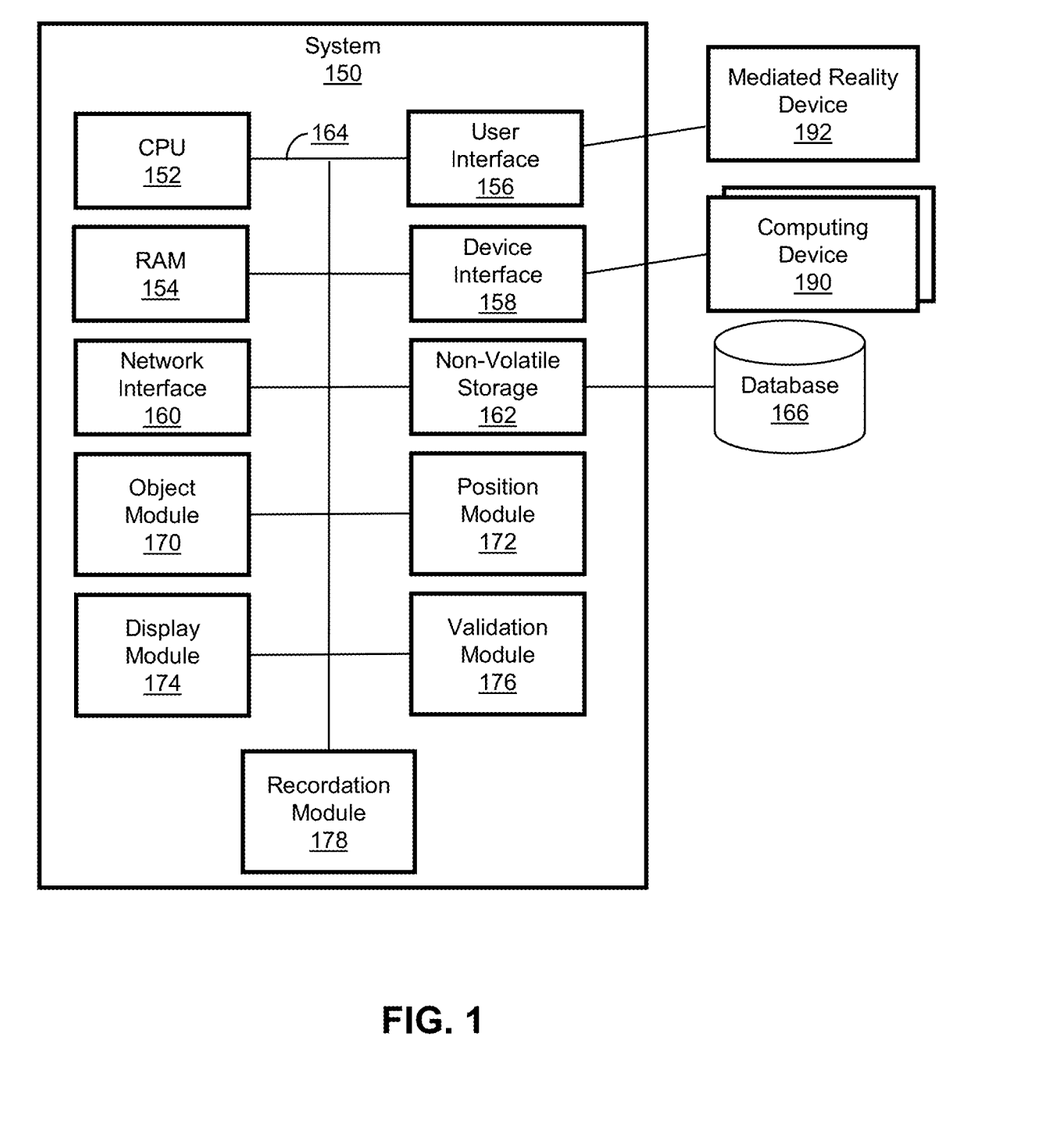
FIG. 1 illustrates a block diagram of a system of collecting geospatial object data with mediated reality, according to an embodiment.

Turning to FIG. 1, a system of validating geospatial data with mediated reality 150 is shown, according to an embodiment. In this embodiment, the system 150 is run on a local computing device (for example, a mobile device). In further embodiments, the system 150 can be run on any other computing device; for example, a server, a dedicated price of hardware, a laptop computer, a smartphone, a tablet, mixed reality devices such as Microsoft™ HoloLens™, true holographic systems, purpose-built hardware, or the like. In some embodiments, the components of the system 150 are stored by and executed on a single computing device. In other embodiments, the components of the system 150 are distributed among two or more computer systems that may be locally or remotely distributed; for example, using cloud-computing resources.

FIG. 1 shows various physical and logical components of an embodiment of the system 150. As shown, the system 150 has a number of physical and logical components, including a central processing unit ("CPU") 152 (comprising one or more processors), random access memory ("RAM") 154, a user interface 156, a device interface 158, a network interface 160, non-volatile storage 162, and a local bus 164 enabling CPU 152 to communicate with the other components. CPU 152 executes an operating system, and various modules, as described below in greater detail. RAM 154 provides relatively responsive volatile storage to CPU 152. The user interface 156 enables an administrator or user to provide input via an input device, for example a mouse or a touchscreen. The user interface 156 also outputs information to output devices; for example, a mediated reality device 192, a display or multiple displays, a holographic visualization unit, and the like. The mediated reality device 192 can include any device suitable for displaying augmented or mixed reality visuals; for example, smartphones, tablets, holographic goggles, purpose-built hardware, or other devices. The mediated reality device 192 may include other output sources, such as speakers. In some cases, the system 150 can be collocated or part of the mediated reality device 192. In some cases, the user interface 156 can have the input device and the output device be the same device (for example, via a touchscreen).

The network interface 160 and/or the device interface 158 permits communication with other systems or devices, such as other computing devices and servers remotely located from the system 150. The device interface 158 can communicate with one or more other computing devices 190 that are either internal or external to the system 150; for example, a GNSS device to capture a position and/or elevation, a camera or camera array to capture image(s) of a scene, sensors for determining position and/or orientation (for example, time-of-flight sensors, compass, depth sensors, spatial sensors, inertial measurement unit (IMU), laser mapping, and the like). In some cases, at least some of the computing devices 190 can be collocated or part of the mediated reality device 192. In some embodiments, the device interface 158 can receive and send data to other devices, such as positions, elevations, and images, which have been previously captured, from the local database 166 or a remote database via the network interface 160.

Non-volatile storage 162 stores the operating system and programs, including computer-executable instructions for implementing the operating system and modules, as well as any data used by these services. Additional stored data can be stored in a database 166. During operation of the system 150, the operating system, the modules, and the related data may be retrieved from the non-volatile storage 162 and placed in RAM 154 to facilitate execution.

In an embodiment, the system 150 further includes a number of modules to be executed on the one or more processors 152, including an object module 170, a position module 172, a display module 174, a validation module 176, and a recordation module 184.

Figure 2:
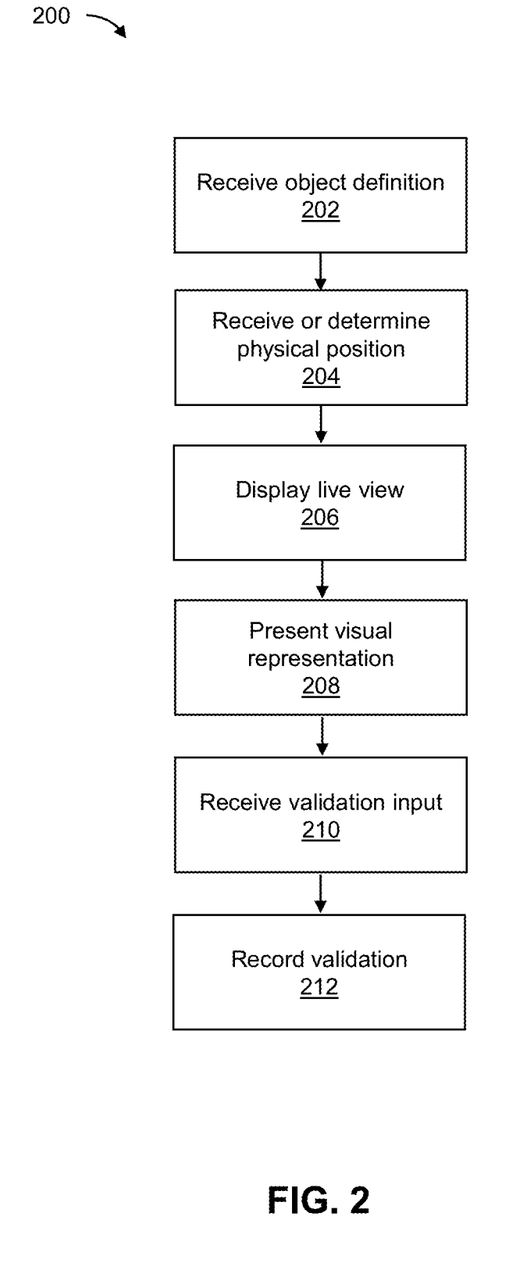
FIG. 2 illustrates a flow diagram of a method of collecting geospatial object data with mediated reality, according to an embodiment.

Turning to FIG. 2, a flowchart for a method of validating geospatial data with mediated reality 200 is shown, according to an embodiment.

At block 202, the object module 170 receives an object definition associated with a geospatial object that has been collected by a computing device 190 comprising a geographic information system (GIS). The geospatial object data corresponds to a geospatial object physically located in space and the collection of the geospatial object data can be accomplished using any suitable approach. In an example, a user collecting geospatial object data can place a GNSS and/or RTK on top or near a point associated with the object they want to collect. In other cases, the user can use a laser mapping device to remotely determine a distance and elevation to such point; in some cases, using GNSS and/or RTK for positioning information as an anchor. After identification of the position and/or elevation of the object, this information can be stored as part of an object definition for the geospatial object. The object definition can be stored locally on the respective computing device 190, stored on the database 166, or stored remotely (for example, a cloud-based or server-based repository) and communicated via the network interface 160.

The object definition includes the type of object (for example, a pipe or a point) and the geographical coordinates of its physical position. In further cases, the object definition can also include attributes or characteristics of the object. In most cases, the geographical coordinates are relative to the surface of the earth, for example latitude and longitude. In other cases, the geographical coordinates can be relative to another object; for example, relative to a building or landmark. In some cases, the object definition includes other properties; for example, an elevation, an object type, an object size, an object orientation, a material type, and the like.

In some cases, the object definition can include representation information for the geospatial object. In some cases, the representation information can include a point, line, or area associated with the physical position of the geospatial object. In other cases, the representation information can include information required for creating more sophisticated 3D visuals; for example, geometry type, a 3D model, an object type (such as hydrant or manhole), object condition, colour, shape, and other parameters. In some cases, the representation information can be determined by the computing device 190 comprising the spatial sensor and included in the object definition sent to the system 150. In other cases, the representation information can be determined by the object module 170 upon receiving the object definition. For example, by referencing the properties of the object in the object definition. As an example, the object definition can include: a manhole 1.2 m wide and 3.2 m deep with grey cover installed in 1987 oriented 14d North.

In some cases, the object module 170 can receive the object definition using "push" or "pull" approaches; such as over an application programming interface (API). In some cases, the format of the object definition can include GeoJSON or other protocols.

In some cases, once the user captures a position of a geospatial object, the object definition is automatically sent to the object module 170 and method 200 proceeds. In other cases, once the user captures a position of a geospatial object, the user is given the option to proceed with the method 200 and thus send the object definition to the object module 170.

At block 204, the position module 172 receives or determines a physical position of the system 150 from a computing device 190 comprising a spatial sensor; where the physical position includes geographical coordinates. In most cases, the geographical coordinates are relative to the surface of the earth, for example latitude and longitude. In other cases, the geographical coordinates can be relative to another object; for example, relative to a building or landmark. In some cases, the physical position includes an elevation. In some cases, the position module 172 also receives or determines an orientation or bearing of the system 100; for example, comprising the physical orientation of the direction of the camera. In an example, the position module 172 can determine the position and orientation in 2D or 3D space (latitude, longitude, and, in some cases, elevation) using internal or external spatial sensors and positioning frameworks; for example, global position system (GPS), GNSS and/or RTK, Wi-Fi positioning system (WPS), manual calibration, vGIS calibration, markers, and/or other approaches. The position module 172 can then track the position and/or the orientation during operation of the system 150. The physical position is used by the system 150 to, as described herein, accurately place the visual representation of the geospatial object displayed to the user relative to the physical space using the position of the geospatial object in the physical space in the object definition.

At block 206, in some cases, the display module 174 displays a mediated reality 'live' view (such as a video stream or a sequential stream of captured images) received from a camera. This live view is oriented in the direction of the system 150 as received by the position module 172 in block 202. In embodiments using holographic devices, in some cases, receiving the 'live view' can be omitted because the visual representation itself is displayed in the physical space.

At block 208, the display module 174 presents a visual representation to the user via the user interface 156, where the visual representation is a representation of the received object definition. The object definition includes has spatial attributes (for example, latitude, longitude, and elevation), which the display module 174 can use, in conjunction with the physical position information from the position module 172, to place the visual representation relative to the captured scene. For example, placing the visual representation of the object overlaid onto the live view. In most cases, the object definition can be used to scale the visual representation according to the 3D perspective of the live view.

The visual representation can be, for example, a three-dimensional (3D) digital-twin model resembling the collected object. In further cases, the visual representation can be, for example, a symbol representing the object, such as a point, a flag, a tag, or the like. In further cases, the visual representation can be, for example, a schematic representation, a raster image, or the like. In some cases, the type of visual representation can be associated with the object in the library; and in other cases, the type of visual representation can be selected by the user.

In some cases, for example where the visual representation is anything other than a 3D model of the object (for example, a manhole symbolized by a point or a flag), a key location (for example, the point or the base of the symbol) can be placed at a respective key point of the physical object captured by the camera (for example, at the center of the manhole). In some cases, the symbology for each object, as well as the key locations and points, can be defined by each user.

In some cases, along with the visual representation, other information can be displayed; for example, distance, elevation, size, shape, colours, and the like, can be displayed to assist with visualization and/or precise placement. In some cases, such as with GIS, the visual representation location can be represented by a single point, line, or outline, and to help the user understand where the object is placed, a point, a cross, a line, or other means, can be used within the visual representation.

In other cases, the display module 174 can stream the visual representation (for example, a 3D model or model rendering) from a server, cloud-based infrastructure, or other external processing device. Instructions for such streaming can be provided in any suitable format (for example, KML or GeoJSON) or any other proprietary format.

Figure 5:
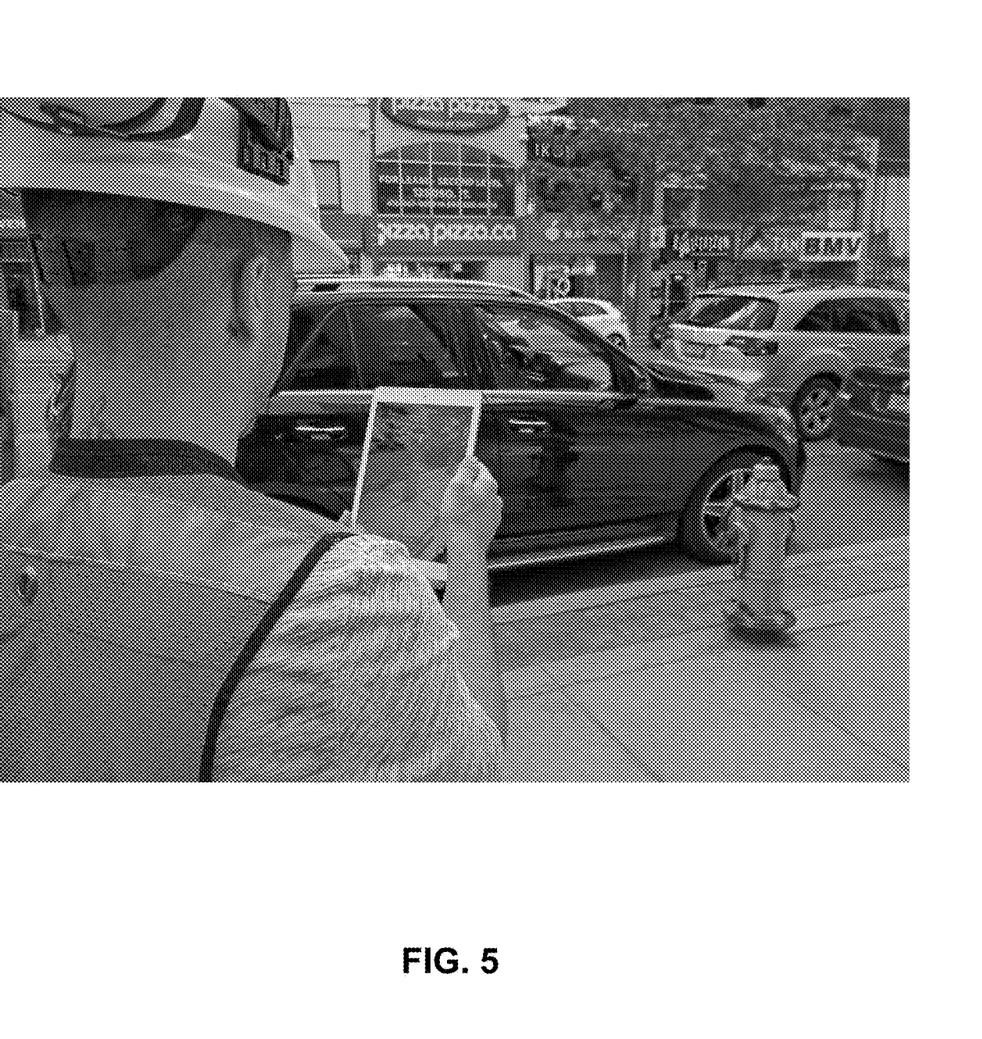
FIG. 5 illustrates an exemplary image of a user validating geospatial objects using the system of FIG. 1.

FIG. 5 illustrates an example of a user (surveyor) validating the position of piping of a fire hydrant. In this example, the system 150 is located on a tablet computer. The object module 172 has received geospatial object data for the piping of the fire hydrant and the display module 174 displays a 3D model as a visual representation of the object on the display of the tablet. The visual representation is displayed by the display module 174 overtop of a live view that is being captured by the rear-facing camera of the tablet.

In some cases, the position of the object represented by the visual representation by the display module 174 can be accurately determined; for example, by the position module 172, by using the position of the system 150 (for example, its latitude, longitude, and elevation), an azimuth of the system 150, and the distance to one or more objects captured by the camera. In some cases, the position module 172 can capture metadata from the GNSS and/or RTK device, and then correct it for the elevation and distance difference between the GNSS antenna and the presented visual representation to achieve survey-grade data accuracy. In some cases, the user can update the position and/or the properties of the visual representation manually.

In an example, when the position module 172 determines the system's 150 location and orientation in x,y,z space, the position module 172 also determines the position and orientation of the physical camera (x,y,z plus bearing). The display module 174 can use the positioning information to access spatial data (the data with x,y,z coordinates) and create (or use an existing) visual representation (for example, a 3D model). The display module 174 can place the virtual camera in the location of the physical camera (x,y,z plus bearing) relative to the visual representation. The visual representation can be overlaid on top of the physical representation such that it can appear in the correct location, matching physical objects around it. In this way, by understanding x,y,z and orientation of the physical camera, the display module 174 can display visual representations of objects that are in the scene (or field of view), and size and orient the visual representation to allow for visualization that matches the physical world accurately.

In some cases, distance to the physical geospatial object can be measured using distance finders. The distance finder may also detect the object's elevation (either relative or absolute). Examples of other distance determination approaches can include optical tools, such as depth cameras or time-of-flight sensor, or image processing that compares images taken from multiple locations or angles to determine distances. These other approaches can be used separately, or they can be connected or associated with the system 150 to provide information automatically. For example, the display module 174 may display cross-hairs and, upon aligning the cross-hairs with the physical object, the system 150 can send a request to a distance finder to determine the distance to that point. In another example, the user interface 156 can receive an indication from the user of a point they want to measure the distance to. In another example, an external distance finder can be used to determine the distance to the physical object separately, and that distance can be used to ensure accurate object placement by displaying the distance to the collected object.

At block 210, the validation module 176 receives input with respect to validating the position and attributes of the visual representation relative to the corresponding geospatial object captured in the scene. If visual validation shows discrepancy in alignments and/or any of the associated attributes of the geospatial object and the corresponding visual representation, the user, via the user interface 156, can indicate that there is a discrepancy, and/or indicate that there is a discrepancy with any of the associated attributes.

In some cases, the input received by the validation module 176 could include outputs from machine vision (MV) and/or artificial intelligence (AI) techniques. Such techniques can be used by the display module 174 to automate display of the visual representation. In an example, MV and AI techniques can automatically detect a geospatial object in the captured scene, then validate whether the placement of the visual representation is aligned with the geospatial object in the captured scene. In an example, the outputs from the MV and/or AI techniques can determine the correct position of the visual representation by snapping the visual representation to the corresponding geospatial object captured by the camera (for example, in the example of FIG. 7, snapping the diameter of the pipe to the diameter of the manhole). If this position is different than the position indicated in the object definition, the validation module 176 can indicate a discrepancy, otherwise it can validate the position. In some cases, the machine vision technique can be used to auto-size the visual representation to the geospatial object captured by the camera; then, the user can validate the position.

In some cases, the input received by the validation module 176 could include corrections to attributes or properties (as described herein) associated with the geospatial object; either inputted by the user or automatically detected by the MV and/or AI techniques. For example, corrections to the object type, object size, colours, shape, elevation, rotation, object conditions (e.g., rust or damages), and the like.

In some cases, =the visual representation can be temporarily fixed in place so that the user can look at it from different angles to confirm the location.

At block 212, the recordation module 178 records the validated position of the respective geospatial object as the position of the corresponding visual representation in the captured scene. In some cases, the recordation module 178 also records validated attributes and/or properties of the geospatial object in the object definition (for example as metadata); for example, size, height, orientation, GNSS and/or RTK information, and the like. The recordation can include editing the object definition in a geospatial data storage; for example, on the database 166 or sent to an external storage via the network interface 160. In other cases, a new revised entry can be stored in the geospatial data storage. In some cases, the recordation module 178 can record an image of the physical scene in association with the validated position; where this image can be used later for evidence purposes.

The storage methods may include on device storage, or synchronization with centralized data repository such as a GIS system, or through other means that would allow for the storage and retrieval of spatial data.

Figure 6:
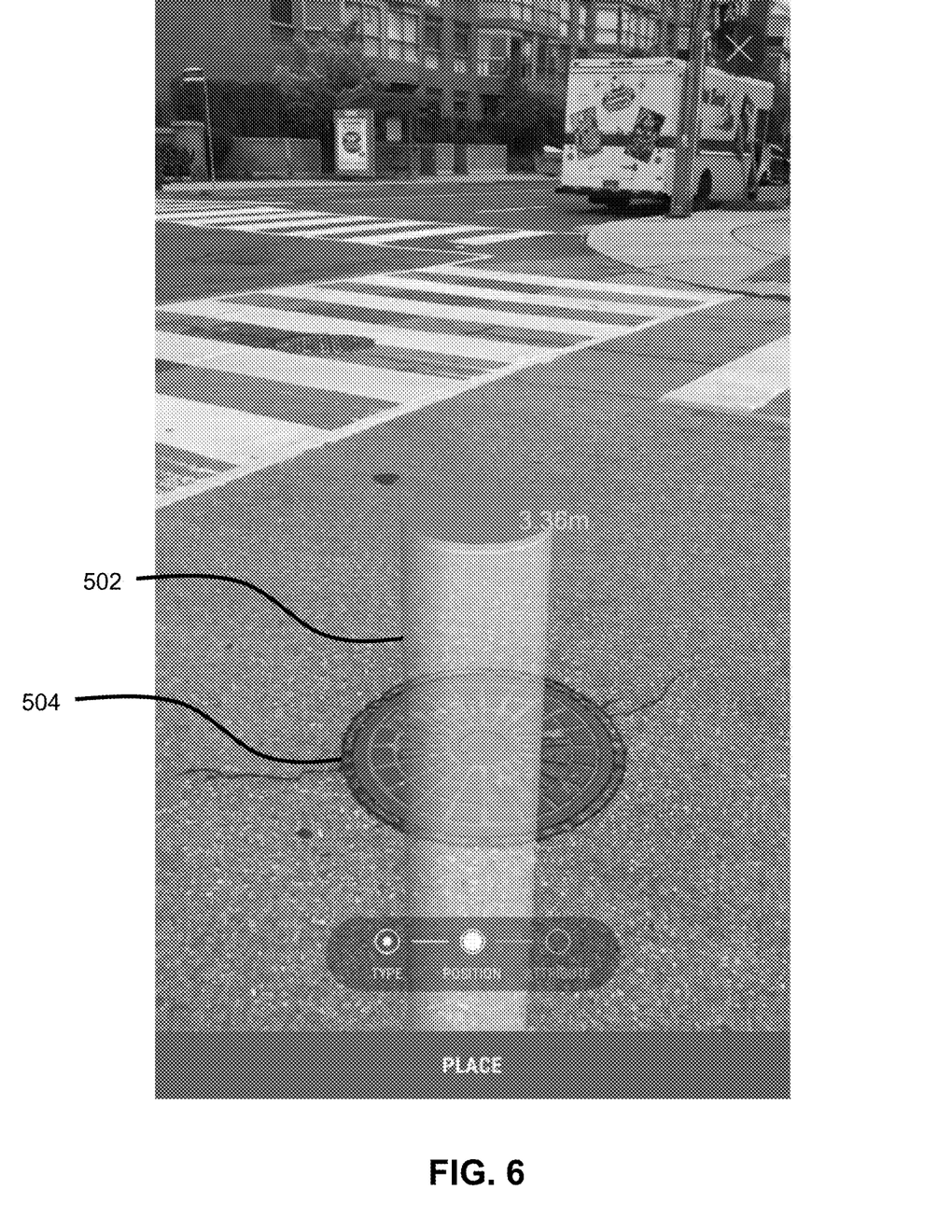
FIG. 6 illustrates an example screenshot of a visual representation of a received geospatial object over a captured scene, in accordance with the system of FIG. 1.
Figure 7:
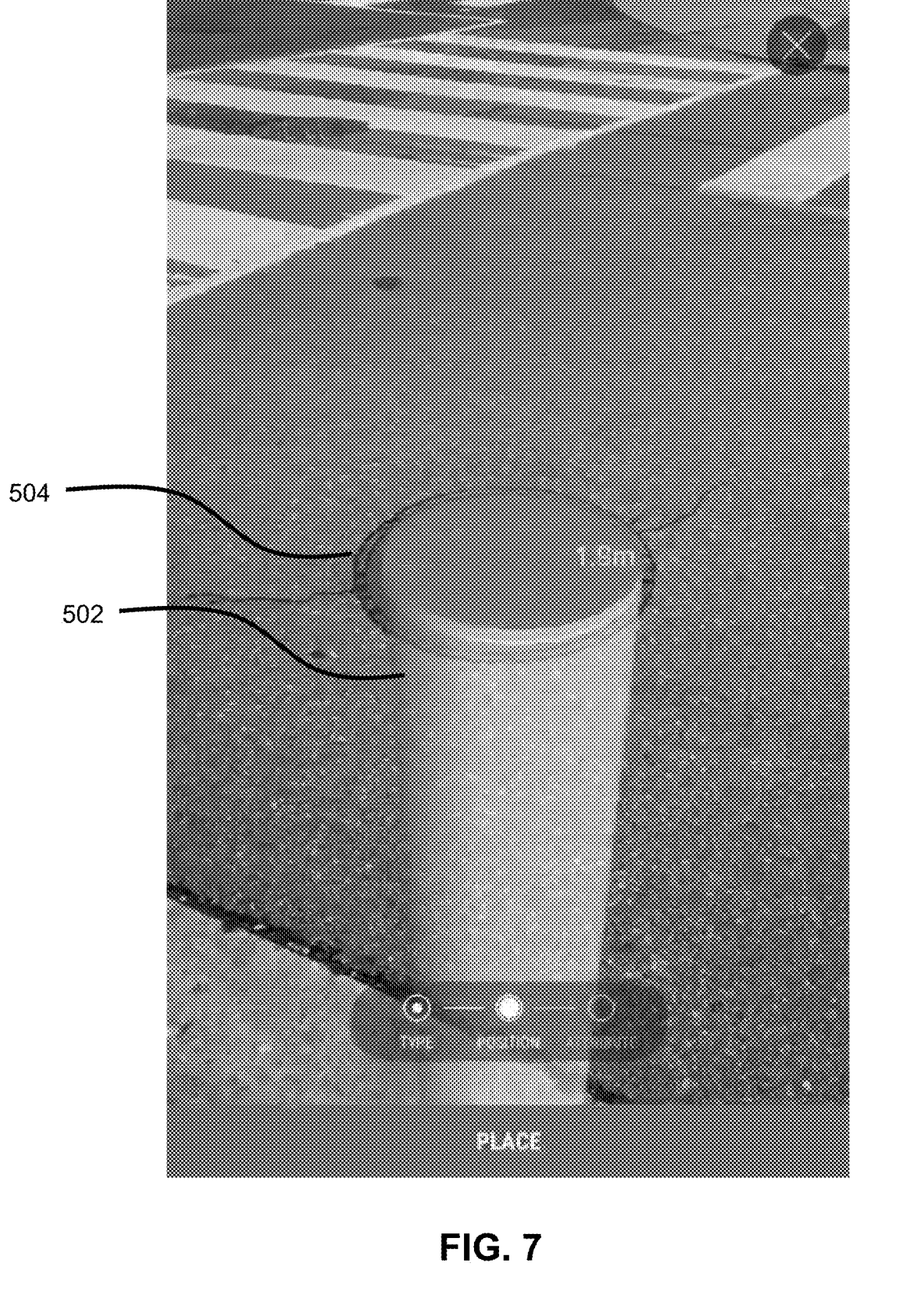
FIG. 7 illustrates an example screenshot of validating placement of the visual representation of the object of FIG. 6, in accordance with the system of FIG. 1.
Figure 8:
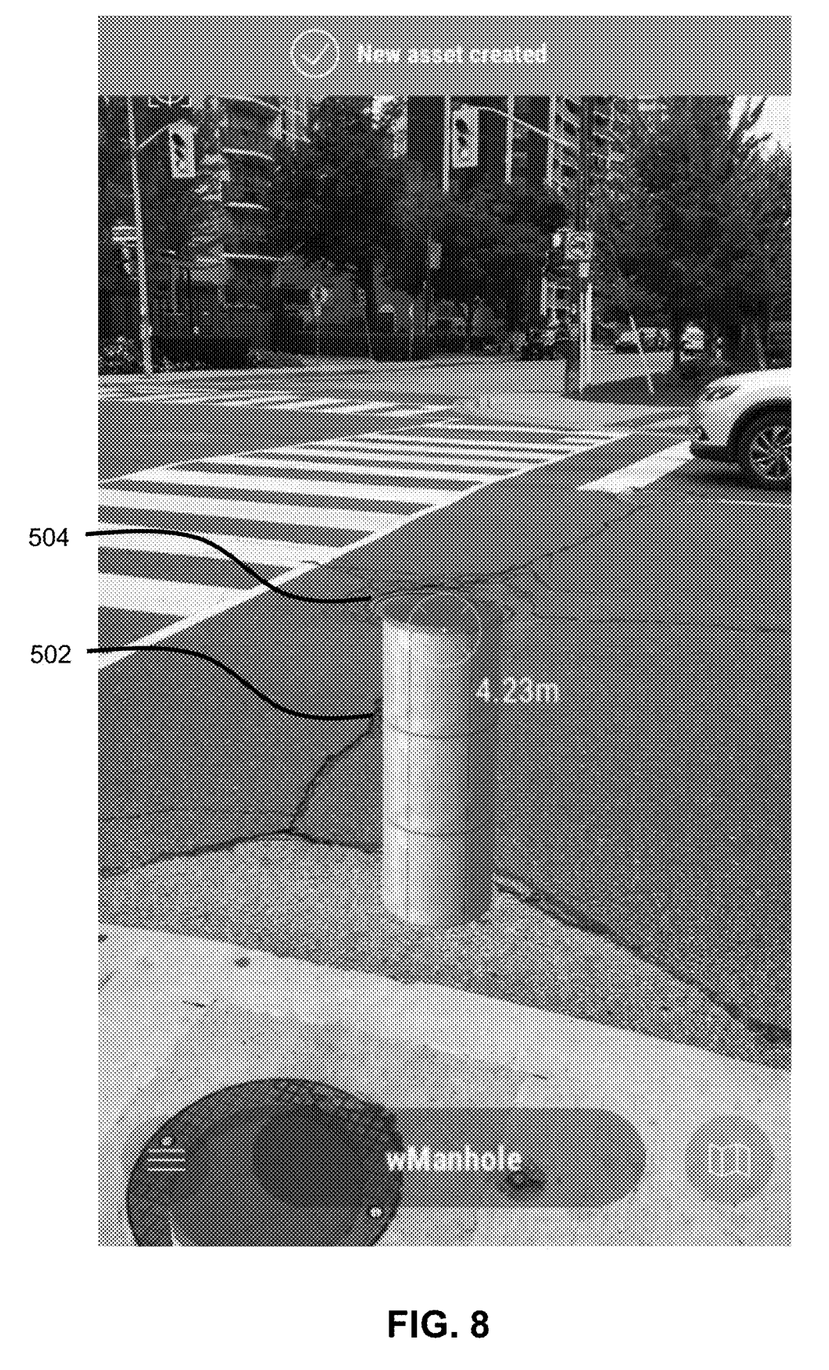
FIG. 8 illustrates an example screenshot of recordation of the verified placement of the object of FIG. 6, in accordance with the system of FIG. 1.

FIGS. 6 to 8 illustrate example screenshots of an example implementation of the system 150; in this example, validating the position of a pipe located beneath a manhole. FIG. 6 illustrates an example screenshot of the display module 174 displaying a 3D model visual representation of the pipe 502 with the positioning as dictated by the object definition received by the object module 170. As illustrated, the background of the screen can be the mediated reality 'live' view received from the camera that is oriented in the direction of the system 150. In this case, the user would indicate a discrepancy with the placement of the geospatial object in the physical space because the visual representation is no collocated with the corresponding manhole cover. In this example, the visual representation 502 represents a manhole pipe that should be aligned with, and located subsurface to, the manhole cover 504 captured by the camera. FIG. 7 illustrates an example screenshot of the visual representation 502 in which the user would validate the object definition as comprising the correct position of the visual representation 502 relative to the corresponding geospatial object (manhole cover) 504 captured by the camera. FIG. 8 illustrates an example screenshot after the position of the pipe 502 has been validated.

In some cases, the validation module 176 can also receive input of from a user validating attributes associated with the geospatial object via the user interface 156. These attributes can be part of the object definition received by the object module 170. The recordation module 178 can store these validated attributes as metadata associated with the collected object. These attributes can include, for example, elements such as colour, material type, shape, installation date, and the like. In some cases, the system can also automatically capture complementary attributes, for example, date of the validation, person who performed the validation, equipment used, and the like. In some cases, these complementary attributes can be validated using MV and/or AI.

In some cases, the system 150 can be initiated from an external system that provides instructions to begin. Examples of such external systems can include ticket management or spatial tracking systems. In an example, a technician may be reviewing a work ticket using a third-party ticket management system, and as part of the ticket workflow, the external system may launch the system 150 for the technician to complete the assignment. In another example, a technician may be passing through an area for which they will need to collect spatial information. Upon detecting the technician's location, a process may notify the technician about the assignment and automatically launch the system 150.

Advantageously, the present embodiments can reduce costs and speed up geospatial data collection by providing a quicker and more efficient way to validate the data collection.

While the forgoing refers to a camera to capture a physical scene and a screen to display the mixture of physical and visual representations, it is contemplated that any apparatus for blending virtual and real objects can be used; for example, a holographic system that displays holographic augmentation or projects holograms.

Although the foregoing has been described with reference to certain specific embodiments, various modifications thereto will be apparent to those skilled in the art without departing from the spirit and scope of the invention as outlined in the appended claims. The entire disclosures of all references recited above are incorporated herein by reference.

The invention claimed is:

1. A computer-implemented method of positioning a geospatial object with a mediated reality device, the method comprising:
   collecting a geospatial object comprising:
      receiving, from a global navigation satellite systems (GNSS) receiver, GNSS position data based on wireless signals received from a GNSS satellite;
      determining, based on the GNSS position data, a position of a geospatial object;
      generating an object definition associated with the geospatial object, the object definition comprising the position of the geospatial object and a type of the geospatial object; and
      storing the object definition in a data storage; and
   immediately after collecting the geospatial object, displaying and verifying the position of the geospatial object, by:
      determining an orientation of the mediated reality device in a physical scene;
      determining relative positioning of the geospatial object in the physical scene based on the position of the geospatial object relative to the orientation of the mediated reality device;
      displaying a visual representation of the geospatial object to a user on the mediated reality device using the relative positioning of the geospatial object in the physical scene for the user to verify positioning of the geospatial object; and
      receiving input confirming a placement of the visual representation relative to the corresponding geospatial object located in the physical scene.

2. The method of claim 1, wherein the position of the geospatial object in the object definition comprises latitude, longitude, and elevation.

3. The method of claim 2, wherein the position of the geospatial object in the object definition comprises a point associated with the geospatial object.

4. The method of claim 3, wherein the position of the geospatial object is determined using both global navigation satellite systems (GNSS) and real-time kinematic (RTK) positioning.

5. The method of claim 2, wherein the orientation of the mediated reality device in the physical scene comprises latitude, longitude, elevation, and direction.

6. The method of claim 1, wherein receiving input confirming the placement of the visual representation of the geospatial object comprises receiving a confirmatory input from a user.

7. The method of claim 1, wherein receiving input confirming the placement of the visual representation of the geospatial object comprises receiving a confirmatory output from machine vision and artificial intelligence techniques.

8. The method of claim 1, further comprising recording, in the object definition, the confirmed position associated with the geospatial object.

9. The method of claim 1, wherein the visual representation comprises a virtual model of the geospatial object based on the type of object in the objection definition.

10. A system of positioning a geospatial object with a mediated reality device, the system comprising one or more processors and data storage memory in communication with the one or more processors, the one or more processors configured to execute:
   a recordation module to collect a geospatial object by receiving, from a global navigation satellite systems (GNSS) receiver, GNSS position data based on wireless signals received from a GNSS satellite and determine, based on the GNSS position data, a position of a geospatial object;
   an object module to generate and store an object definition associated with the collected geospatial object in a data storage, the object definition comprising the position of the geospatial object and a type of the geospatial object;
   a position module to determine an orientation of the mediated reality device in a physical scene and to determine relative positioning of the geospatial object in the physical scene based on the position of the geospatial object relative to the orientation of the mediated reality device;
   a display module to, immediately after collecting the geospatial object, display a visual representation of the geospatial object to a user on the mediated reality device using the relative positioning of the geospatial object in the physical scene for the user to verify positioning of the geospatial object; and
   a validation module to receive input confirming a placement of the visual representation relative to the corresponding geospatial object located in the physical scene.

11. The system of claim 10, wherein the position of the geospatial object in the object definition comprises latitude, longitude, and elevation.

12. The system of claim 11, wherein the position of the geospatial object in the object definition comprises a point associated with the geospatial object.

13. The system of claim 12, wherein the position of the geospatial object is determined using both global navigation satellite systems (GNSS) and real-time kinematic (RTK) positioning.

14. The system of claim 11, wherein the orientation of the mediated reality device in the physical scene comprises latitude, longitude, elevation, and direction.

15. The system of claim 10, wherein receiving input confirming the placement of the visual representation of the geospatial object comprises receiving a confirmatory input from a user via an input device.

16. The system of claim 10, wherein receiving input confirming the placement of the visual representation of the geospatial object comprises receiving a confirmatory output from machine vision and artificial intelligence techniques.

17. The method of claim 10, wherein the recordation module further records, in the object definition, the confirmed position associated with the geospatial object.

18. The system of claim 10, wherein the visual representation comprises a virtual model of the geospatial object based on the type of object in the objection definition.

* * * * *